(12) United States Patent
Chen

(10) Patent No.: US 8,489,249 B2
(45) Date of Patent: Jul. 16, 2013

(54) INTELLIGENT POWER SAVING SYSTEM

(75) Inventor: Chin-Chou Chen, Hsinchu (TW)

(73) Assignee: Phoenix Silicon International Corporation, Hsinchu (TW)

( * ) Notice: Subject to any disclaimer, the term of this patent is extended or adjusted under 35 U.S.C. 154(b) by 255 days.

(21) Appl. No.: 12/852,680

(22) Filed: Aug. 9, 2010

(65) Prior Publication Data
US 2012/0035780 A1 Feb. 9, 2012

(51) Int. Cl.
*G05D 5/03* (2006.01)
(52) U.S. Cl.
USPC .......................................... 700/298; 700/297
(58) Field of Classification Search
USPC .......................................................... 700/297
See application file for complete search history.

(56) References Cited

U.S. PATENT DOCUMENTS

| | | | |
|---|---|---|---|
| 6,169,389 B1 * | 1/2001 | Chen | 320/166 |
| 7,259,478 B2 * | 8/2007 | Sinha | 307/66 |
| 7,412,305 B2 * | 8/2008 | Berard | 700/297 |
| 7,786,620 B2 * | 8/2010 | Vuk et al. | 307/66 |
| 2005/0122652 A1 * | 6/2005 | Richardson et al. | 361/92 |
| 2007/0029969 A1 * | 2/2007 | Wang et al. | 320/128 |
| 2007/0166617 A1 * | 7/2007 | Gozdz et al. | 429/231.95 |
| 2008/0245587 A1 * | 10/2008 | Sastry et al. | 180/65.2 |

FOREIGN PATENT DOCUMENTS
WO WO2005041326 A2 * 5/2005

* cited by examiner

*Primary Examiner* — Mohammad Ali
*Assistant Examiner* — Sivalingam Sivanesan
(74) *Attorney, Agent, or Firm* — Rosenberg, Klein & Lee

(57) ABSTRACT

An intelligent power saving system, disposed between a Utility Power Supply and at least a load, comprising: at least an energy storage device; at least a power supply line, connected to said Utility Power Supply and said load; at least an energy-storage-device-parallel-connection circuit, connecting said energy storage device electrically to said power supply line; and a power monitor, connected electrically to said Utility Power Supply, said energy storage device, and said energy-storage-device-parallel-connection circuit, thus determining whether said energy storage device is required to join in providing power to said load through said energy-storage-device-parallel-connection circuit, thus regulating percentage of total power supplied by said Utility Power Supply, preventing overload of said Utility Power Supply, hereby saving expense of the electric utility bills.

8 Claims, 4 Drawing Sheets

INTELLIGENT POWER SAVING SYSTEM

BACKGROUND OF THE INVENTION

1. Field of the Invention

The present invention relates to an intelligent power saving system, and in particular to an intelligent power saving system, that is realized through an energy storage device of a parallel connection structure.

2. The Prior Arts

Presently, for the power supply systems of various countries in the world, the most difficult and troublesome problem for the Power Company is that: too much power demand during peak period, so that the power company has to provide much more additional power plants, and the related power transmission and distribution facilities; while, in contrast, during the off-peak period, the power demand is too low, thus leading to the waste of large amount of electricity.

Moreover, by way of example, in the Electricity Utilization Technical Rules of the Taiwan Power Company, it is stipulated that for a user power consumption exceeding but no more than 10% of its contract capacity, its utility rate is doubled; however, for a user power consumption exceeding and more than 10% of its contract capacity, its utility rate is tripled. Therefore, presently, the problem of how to control effectively the power consumption to within its contract capacity is a most important task of cost saving in the Industry.

On the other hand, in the worldwide tendency and development of Carbon Emission Right Trading, and according to Carbon Footprint surveys conducted for various companies of the Industry, power consumption accounts for 60%~80% Carbon Footprint of an ordinary company. Therefore, in case that a power company is able to manage and control power consumption of its user more correctly, then its operation efficiency can be increased significantly, hereby reducing the percentage of electricity carbon footprint, and raising the competitiveness of the enterprises in the world market.

Therefore, presently, the design and performance of power management system are not quite satisfactory, and it has much room for improvement.

SUMMARY OF THE INVENTION

In view of the problems and shortcomings of the prior art, the present invention provides an intelligent power saving system, that is capable of solving the problem of the prior art.

A major objective of the present invention is to provide an intelligent power saving system, that is able to prevent power consumption of its users exceeding their contract capacities, so as to save the expense for the electric utility bills.

Another objective of the present invention is to provide an intelligent power saving system, such that users may inspect and obtain the optimal contract capacity after installing the energy storage device, for applying to the power company for a reduced contract capacity, so as to save expense of the electrical utility bills, and reducing percentage of carbon footprint.

A yet another objective of the present invention is to provide an intelligent power saving system, so that power company does not have to install additional power plants for the peak period excessive power demand, or it may even operate at a reduced power generating capacity.

In order to achieve the above mentioned objective, the present invention provides an intelligent power saving system, installed between a Utility Power Supply and at least a load, comprising: at least an energy storage device; a power supply line, connected to the Utility Power Supply and at least a load; at least an energy-storage-device-parallel-connection circuit, connecting the energy storage device electrically to the power supply line; and a power monitor, connected electrically to the Utility Power Supply, the energy storage device, and the energy-storage-device-parallel-connection circuit respectively, and it is able to determine whether the energy storage device is capable of providing power to the various loads through the energy-storage-device-parallel-connection circuit.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
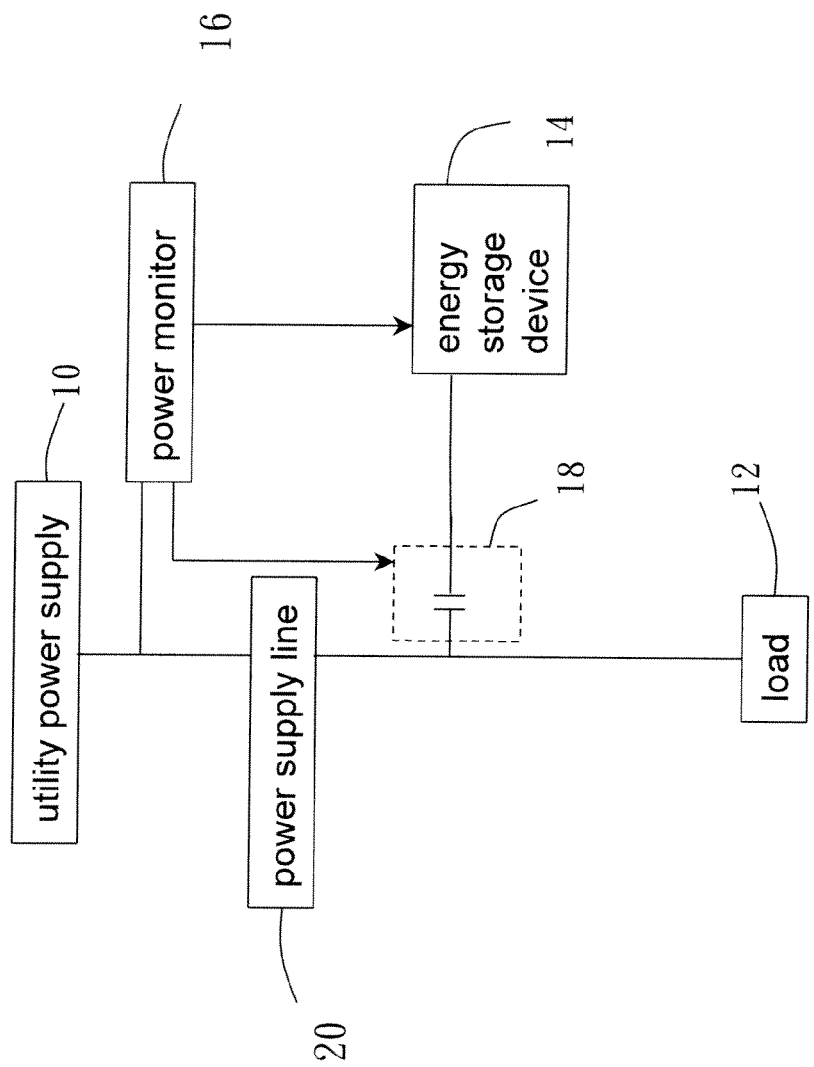
FIG. 1 is a block diagram of an intelligent power saving system according to an embodiment of the present invention.

Firstly, refer to FIG. 1 for a block diagram of an intelligent power saving system according to an embodiment of the present invention. As shown in FIG. 1, an intelligent power saving system of the present invention is installed between a Utility Power Supply 10 and at least a load 12, comprising at least an energy storage device 14; at least a power supply line 20, connected to the Utility Power Supply 10 and the load 12; at least an energy-storage-device-parallel-connection circuit 18, connecting the energy storage device 14 electrically to the power supply line 20; and a power monitor 16, connected electrically to the Utility Power Supply 10, the energy storage device 14, and the energy-storage-device-parallel-connection circuit 18 respectively, such that it is able to determine whether the energy storage device 14 is capable of providing power o the load 12 through the energy-storage-device-parallel-connection circuit 18, so as to regulate the percentage of the power provided by the Utility Power Supply.

When the power monitor 16 detects that the amount of power supplied by the Utility Power Supply 10 to the power supply line 20 is close to a specific predetermined value, such as a contract capacity signed with the power company, then the power monitor 16 will adjust the voltage of energy storage device 14 to be greater than that of the power supply line 20, so that the power of the energy storage device 14 can be put into the power supply line 20 though energy-storage-device parallel-connection circuit 18 for supplying to a load 12, thus regulating the percentage of power supplied by the Utility Power Supply. By way of example, in case that the contract power utilization amount signed with a Power Company is 300 kW, and when a power monitor 16 detects that the power supplied by Utility Power Supply 10 to a load is equal to 300 kW, the power monitor 16 will put the power of the energy storage device 14 into the power supply line 20, thus avoiding the additional cost incurred by power consumption exceeding the contract capacity.

The energy storage device 14 mentioned above can be a LiFeP battery, and the power monitor 16 is able to monitor and control to check if the energy storage device 14 is functioning normally. Moreover, in the off-peak period, when the power rate is cheaper, the power of Utility Power Supply 10 can be used to charge the energy storage device 14, so that in the peak period, the power from the energy storage device 14 can be used to relieve the power demand, thus achieving the objective effectively that the contract capacity of a user will not be surpassed.

Figure 2:
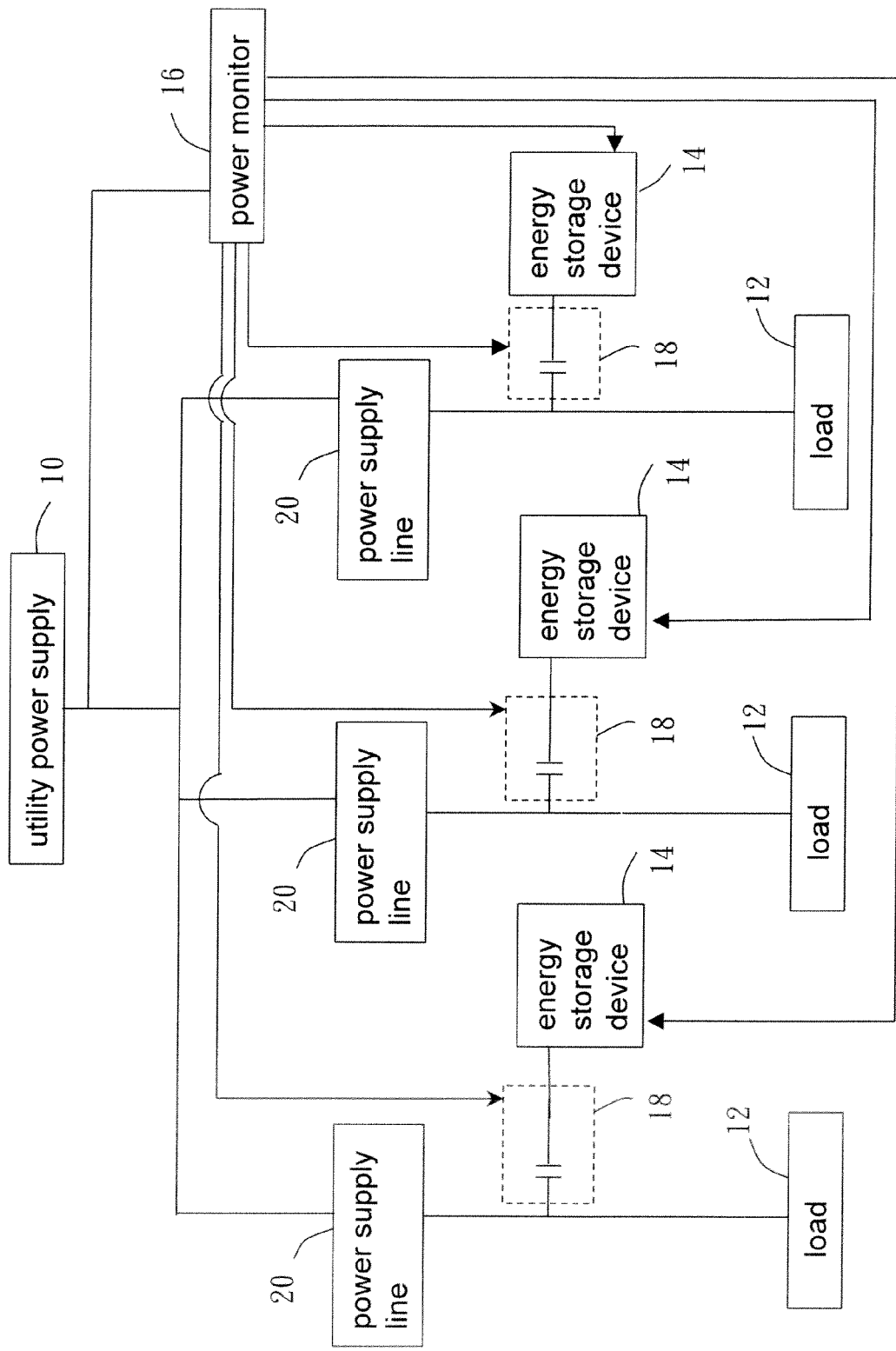
FIG. 2 is a block diagram of an intelligent power saving system according to another embodiment of the present invention.

Next, refer to FIG. 2 for a block diagram of an intelligent power saving system according to another embodiment of the present invention. The differences between FIG. 1 and FIG. 2 are that, in FIG. 2 a plurality of loads 12 are designed, such that the power supply lines 20 provided by the Utility Power Supply to the load 12 can be varied depending on the number of the loads. Similarly, the number of energy storage devices 14 and energy-storage-device-parallel-connection circuits 18 can also be varied depending on the number of the loads, so that each load 12 is connected in parallel with an energy storage device 14. As shown in the drawings, all the energy-storage-device-parallel-connection circuits 18 are connected to a power monitor 16 for centralized control and management.

Figure 3:
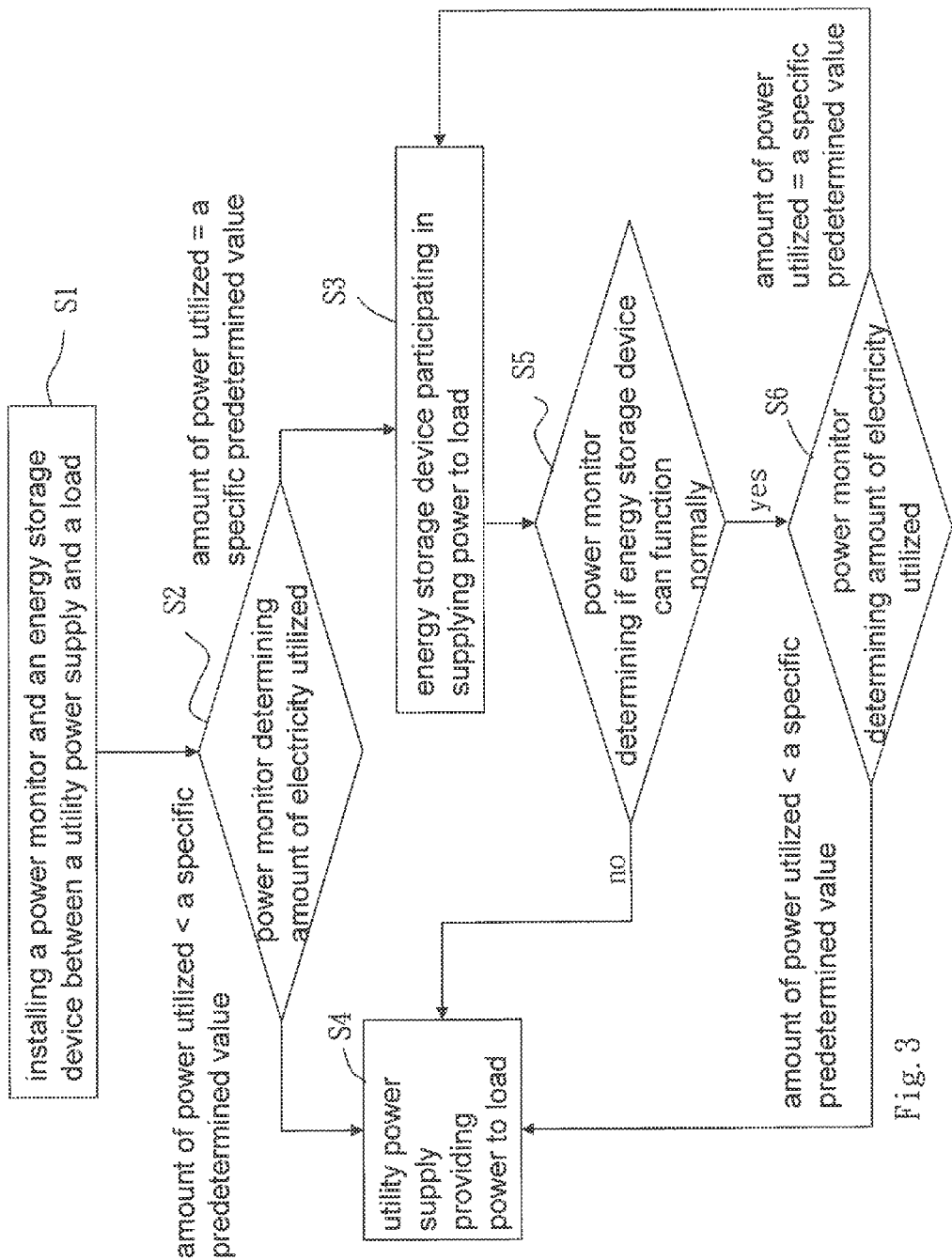
FIG. 3 is a flowchart of the steps of implementing a method of intelligent power saving according to the present invention.

Then, refer to FIGS. 1 and 3 at the same time. FIG. 3 is a flowchart of the steps of implementing a method of an intelligent power saving according to the present invention. As shown in FIG. 3, firstly as shown in step S1, disposing a power monitor 16 and at least an energy storage device 14 between a Utility Power Supply 10 and a load 12, such that the power monitor 16 is connected electrically to Utility Power Supply 10 and energy storage device 14. Then, as shown in step S2, the power monitor 16 determines the amount of power utilized, in case that this amount is equal to a specific predetermined value, then as shown in step S3, the energy storage device 14 is made to join the Utility Power Supply 10 in supplying power to a load; however, in case that this amount is less than a specific predetermined value, then as shown in step S4, the Utility Power Supply 10 alone supplies power to a load 12. In a situation as shown previously in step Si, the energy storage device 14 is made to join the Utility Power Supply 10 in supplying power to a load 12, then as shown in step S5, the power monitor 16 determines that if the energy storage device 14 is functioning normally, or it is in a non-saturation state or a malfunction state; in case that energy storage device 14 is not functioning normally, then the process proceeds to step S4; otherwise, as shown in step S6, when the energy storage device 14 is made to join in providing power to the load 12, the power monitor 16 determines at the same time the power amount utilized, and if the power amount utilized is equal to a specific predetermined value, then the process returns to step S3, such that the energy storage device 14 will continue participating in supplying power to the load 12, otherwise, if the power amount utilized is less than a specific predetermined value, then the process returns to step S4, such that the Utility Power Supply 10 alone supplies power to the load.

In the above description, the power monitor 16 controls and determines if the energy storage device 14 is required to join in supplying power to the load, thus the energy storage device 14 is used to regulate power supply, and that is realized through an energy-storage-device-parallel-connection circuit 18.

Figure 4:
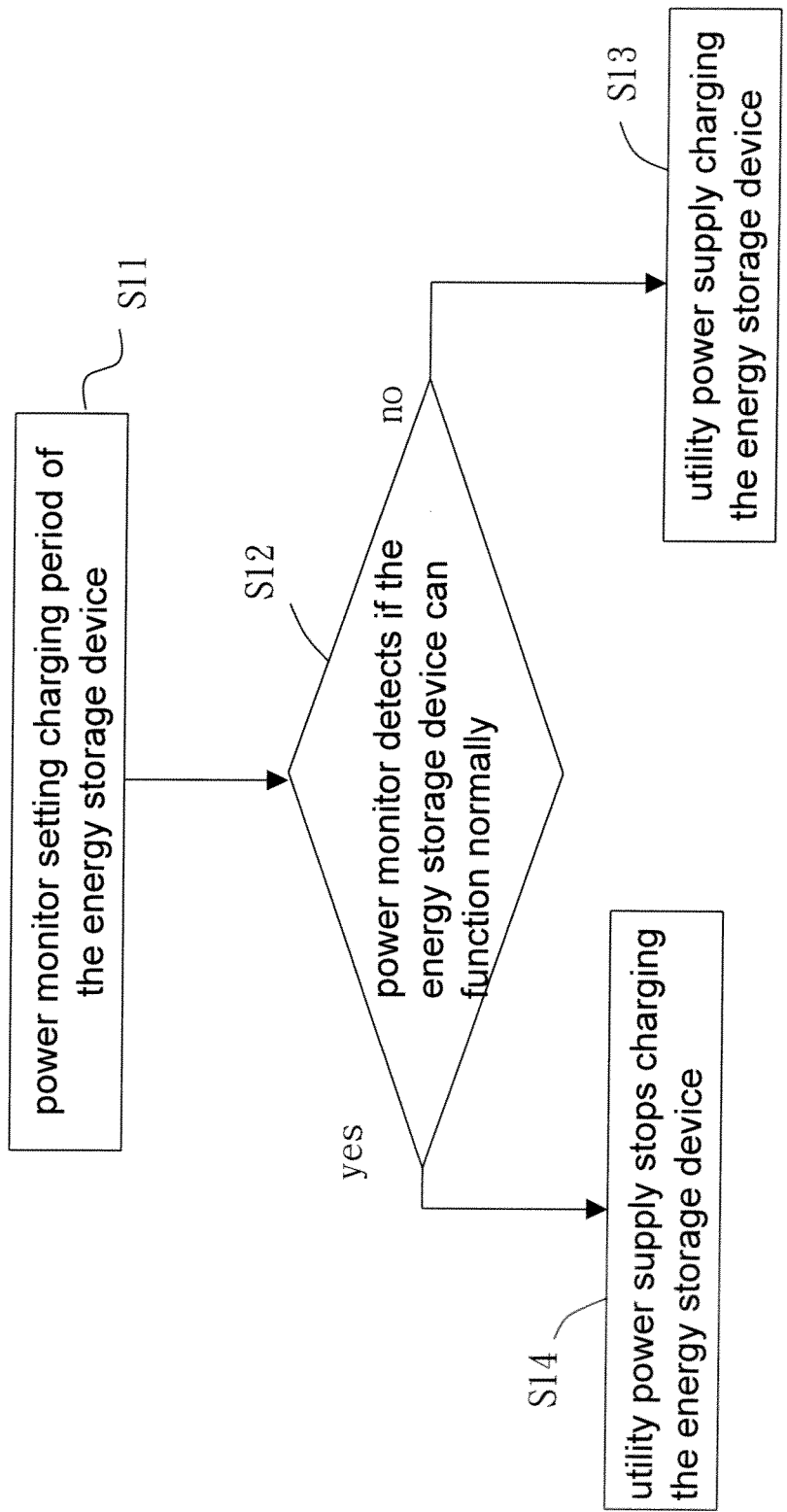
FIG. 4 is a flowchart of the steps a method of charging the energy storage device, when it is detected to find that the energy storage device is in a non-saturation state.

Finally, refer to FIG. 4 for a flowchart of the steps of charging the energy storage device 14, when it is detected in step S5 of FIG. 3 and finds that the energy storage device 14 is in a non-saturation state, then charging the energy storage device 14 as required. As shown in step S11, when the power monitor 16 detects and finds that the energy storage device 14 is in a non-saturation state, the power monitor 16 sets the charging time period, such as an off-peak period for the energy storage device 14. Then, as shown in step S12, the power monitor 16 will detect and determine if the energy storage device 14 is broken down, and if the answer if negative, then as shown in step S13, the Utility Power Supply 10 proceeds with charging the energy storage device 14 through the power supply line 20 and energy-storage-device-parallel-connection circuit 18 until its saturation. Otherwise, if the energy storage device 14 is broken down, then as shown in step S14, the Utility Power Supply 10 will not charge the energy storage device 14.

Summing up the above, the present invention provides an intelligent power saving system, wherein, the uninterruptible power supply (UPS) characteristics of an energy storage device, such as a LiFeP battery is utilized to effectively prevent the power consumption of a user exceeding its contract capacity. Furthermore, user of electric utility may obtain the optimal contract power utilization amount from a power utilization curve by inspecting the energy storage device, thus the user may apply to the Power Company for a reduction of the contract power utilization amount, hereby saving the expense for the electrical utility bills, reducing its percentage of Carbon Footprint, and increasing the competitiveness of a company in the international market. In addition, the Power Company does not have to install additional power plants through the stabilized demand of the user, or even be able to operate at reduced power generating capacity.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An intelligent power saving system, disposed between a Utility Power Supply and at least a load, comprising:
   at least an energy storage device;
   at least a power supply line, connected to said Utility Power Supply and said load, said Utility Power Supply providing a predetermined amount of power;
   at least an energy-storage-device-parallel-connection circuit connecting said energy storage device electrically to said power supply line; and
   a power monitor connected electrically to said Utility Power Supply, said energy storage device, and said energy-storage-device-parallel-connection circuit, said power monitor configured to:

determine whether amount of power utilized by said load is equal to or greater than said predetermined amount of power;

determine whether said energy storage device has stored power equal to or greater than said predetermined amount of power;

apply stored power from said energy storage device to said load when said stored power is greater than or equal to said predetermined amount of power; and provide power from said Utility Power Supply to said load when said stored power in said energy storage device is less than said predetermined amount of power.

2. The intelligent power saving system as claimed in claim 1, wherein when said power monitor detects that power supplied by said Utility Power Supply reaches said predetermined amount of power, said power monitor regulates voltage of said energy storage device, so as to regulate percentage of total power supplied by said Utility Power Supply, thereby avoiding exceeding a contract capacity of a user over said predetermined amount of power.

3. The intelligent power saving system as claimed in claim 2, wherein said predetermined amount of power is said contract capacity signed with a Power Company.

4. The intelligent power saving system as claimed in claim 1, wherein said energy storage device is a LiFeP battery.

5. The intelligent power saving system as claimed in claim 1, wherein when said Utility Power Supply is in an off-peak period during which said energy storage device is charged.

6. The intelligent power saving system as claimed in claim 5, wherein said Utility Power Supply proceeds with charging of said energy storage device through said power supply line and said energy-storage-device-parallel-connection circuit.

7. The intelligent power saving system as claimed in claim 1, wherein when a plurality of said loads are provided, number of said energy storage devices and number of said energy-storage-device-parallel-connection circuits are varied depending on number of said loads, such that each load is connected to said energy storage device in parallel.

8. The intelligent power saving system as claimed in claim 1, wherein said power monitor monitors if said energy storage device is functioning normally.

* * * * *